United States Patent [19]

Kanari et al.

[11] Patent Number: 5,176,229
[45] Date of Patent: Jan. 5, 1993

[54] HYDRAULIC SHOCK ABSORBER WITH A ROD GUIDE HAVING AN ANNULAR DOUBLED WALL SECTION

[75] Inventors: Issei Kanari; Yoshiaki Watanabe, both of Kanagawa, Japan

[73] Assignee: Atsugi Unisia Corporation, Japan

[21] Appl. No.: 586,147

[22] Filed: Sep. 21, 1990

[30] Foreign Application Priority Data

Sep. 29, 1989 [JP] Japan .............................. 1-114575[U]
Nov. 28, 1989 [JP] Japan .............................. 1-137588[U]
Feb. 15, 1990 [JP] Japan .............................. 2-14260[U]

[51] Int. Cl.⁵ ................................................ F16F 9/36
[52] U.S. Cl. ................................ 188/322.17; 188/315
[58] Field of Search ..................... 188/322.16, 322.17, 188/315, 320; 280/276, 277, 279, 280; 92/165 R, 168 R, 168 B

[56] References Cited

U.S. PATENT DOCUMENTS

| 2,040,063 | 5/1936 | Padgett | 188/315 |
| 3,866,946 | 2/1975 | Robison | 280/279 |
| 4,108,287 | 8/1978 | Kato | 188/315 |
| 4,274,517 | 6/1981 | Kato et al. | 188/315 |
| 4,438,834 | 3/1984 | Handke et al. | 188/322.17 X |
| 4,445,598 | 5/1984 | Brambilla | 188/322.16 |
| 4,881,750 | 11/1989 | Hartmann | 280/276 |
| 4,989,701 | 2/1991 | Yamaoka et al. | 188/322.17 |

FOREIGN PATENT DOCUMENTS

| 61-82141 | 5/1986 | Japan . |
| 1-94639 | 6/1989 | Japan . |
| 1294523 | 11/1972 | United Kingdom . |
| 2092262 | 8/1982 | United Kingdom . |

Primary Examiner—Robert J. Oberleitner
Assistant Examiner—Peter M. Poon
Attorney, Agent, or Firm—Ronald P. Kananen

[57] ABSTRACT

A hydraulic shock absorber is provided which includes generally a cylinder assembly to define working and reservoir chambers therewithin, a piston rod, a rod guide member which guides bounding and rebounding strokes of the piston rod, and an oil seal contacting with the piston rod to seal an opening of the cylinder assembly. The rod guide member includes outer and inner supporting sections. The inner supporting section also includes outer and inner wall sections which are coaxially arranged with a preselected interval therebetween. The outer wall section is spaced from an inner wall of the cylinder assembly to provide flexibility to the rod guide in cooperation with the inner wall section. The shock absorber further includes a reinforcement partly inserted into the oil seal to provide flexural rigidity to the outer supporting section of the rod guide and a communication path defined by a chambered surface formed on a peripheral surface of the reinforcement and a recessed portion formed in an edge portion of the first supporting section to fluidly connect the working and reservoir chambers.

18 Claims, 6 Drawing Sheets

HYDRAULIC SHOCK ABSORBER WITH A ROD GUIDE HAVING AN ANNULAR DOUBLED WALL SECTION

BACKGROUND OF THE INVENTION

1. Technical Field

The present invention relates generally to a shock absorber for an automotive suspension system. More particularly, the invention relates to a hydraulic shock absorber which has an improved arrangement of a rod guide for guiding reciprocating motion of a piston rod.

2. Background Art

Japanese Utility Model First Publication No. 61-82141 discloses a hydraulic shock absorber which includes a rod guide having an opening in its center through which a piston rod is reciprocally displaced. A peripheral portion of the rod guide which retains the rod guide in a cylinder assembly of the shock absorber is provide with a thick wall having high rigidity.

A rod guide for such a shock absorber is manufactured by powder molding, casting, or machining, resulting in increased weight and manufacturing costs. Additionally, the conventional rod guide has higher rigidity and thus when forces act on the piston rod from a lateral direction, pressure created at a contact point of the piston rod with the rod guide locally becomes great and causes friction between the members to be increased. This results in reduced durability.

Japanese Utility Model First Publication No. 1-94639 discloses a double-cylindered hydraulic shock absorber. This shock absorber includes a rod guide which supports a piston rod so as to allow it to reciprocate. The rod guide has a liquid communication path for allowing liquid flow in a direction from the inner cylinder to the outer (reservoir) cylinder during a piston rebounding stroke. The liquid communication path is defined by cut-out portions in a supporting section of the rod guide, engaging with an inner wall of an outer cylinder, which is made of a metal plate.

An edge of the outer cylinder is crimped so as to cover the supporting section of the rod guide to mount it in the outer cylinder such that a load caused by a bounding and/or rebounding motion of a vehicle body acts on the supporting section. The rigidity of the rod guide is insufficient against the load due to the cut-out portions for defining the communication path. Therefore, a technique for forming a liquid communication path hydraulically connecting between the inner cylinder and the reservoir chamber without reducing rigidity of the metallic supporting section of the rod guide has been sought by designers.

SUMMARY OF THE INVENTION

It is accordingly one object of the present invention to avoid the disadvantages of the prior art.

It is another object of the invention to provide a light-weight shock absorber which is inexpensive to manufacture.

It is a further object of the invention to provide a shock absorber which can unify pressure created on a contact area of a piston rod with a rod guide caused by exertion of lateral force on the piston rod to reduce local friction therebetween for improving durability.

According to one aspect of the present invention, there is provided a shock absorber which comprises a cylinder assembly defining a working chamber in which a piston rod is disposed with a reservoir chamber, and a rod guide, provided in an opening of the cylinder assembly, guiding bounding and rebounding strokes of the piston rod, the rod guide including a first supporting section supporting the rod guide to the cylinder assembly and a second supporting section supporting the piston rod within the working chamber, the second supporting section including outer and inner wall sections, the outer wall section extending from the first supporting section, the inner wall section being spaced from the outer wall section to define a gap therebetween so as to provide a preselected degree of flexibility to the second supporting section.

According to another aspect of the invention, there is provided a shock absorber which comprises a cylinder assembly having a circumferential edge portion at its end so as to define an opening, the cylinder assembly defining a working chamber in which a piston rod is disposed for bounding and rebounding strokes through the opening and a reservoir chamber, an oil seal disposed within the cylinder assembly to contact with the piston rod so as to seal the opening of the cylinder assembly, a rod guide plate member, provided in the cylinder assembly, guiding bounding and rebounding strokes of the piston rod, the rod guide including first and second supporting sections, the first supporting section supporting the oil seal and the second supporting section supporting the piston rod, and a reinforcement provided between the circumferential edge portion and the first supporting section of the rod guide to provide a preselected degree of rigidity to the first supporting section.

According to a further aspect of the invention, there is provided a shock absorber which comprises a cylinder assembly having an opening at its end, the cylinder assembly including outer and inner cylinder sections to define a working chamber in the inner cylinder section filled with a hydraulic working fluid and a reservoir chamber between the outer and inner cylinder sections filled with the hydraulic working fluid and a pneumatic working fluid, a piston rod disposed within the inner cylinder section to reciprocate through the opening of the cylinder assembly, a rod guide member disposed within the cylinder assembly guiding bounding and rebounding strokes of the piston rod, the rod guide including first and second supporting sections, the first supporting section having a peripheral surface, engaging with an end portion of the cylinder assembly for supporting the rod guide, on which a chamfered surface is formed, the second supporting section supporting the piston rod, an oil seal contacting with the piston rod so as to seal the opening of the cylinder assembly, a supporting member engaging with the end portion of the cylinder assembly to support the oil seal, the supporting member having a groove in its edge portion which coincides with the chamfered surface of the first supporting section of the rod guide, and a communicating path defined by the chamfered surface of the rod guide and the groove of the supporting member to fluidly communicate between the working chamber and the reservoir chamber.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

DESCRIPTION OF THE PREFERRED EMBODIMENT

Figure 1:
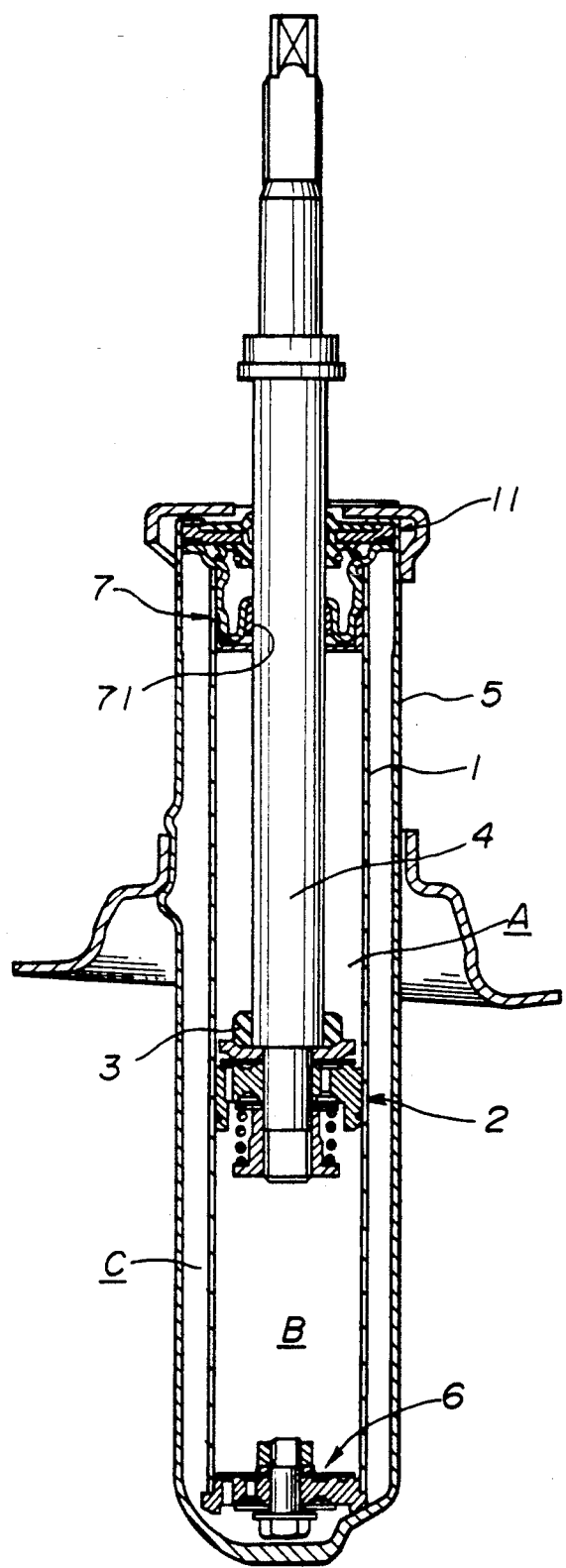
FIG. 1 is a cross sectional view which shows a hydraulic shock absorber according to the present invention.

Referring now to the drawings wherein like numbers refer to like parts in the several views, particularly to FIG. 1, a hydraulic shock absorber according to the present invention is shown. This shock absorber includes generally an inner cylinder 1, a piston 2, a rebound rubber 3, a piston rod 4, an outer cylinder 5, a bottom assembly 6, a rod guide 7, an upper working chamber A, a lower working chamber B, and a fluid reservoir chamber C. The reservoir chamber C is defined between the outer and inner cylinders 5 and 1 and filled with hydraulic fluid and pneumatic fluid. These arrangements are well known in the art and will not be described here in detail.

Figure 2:
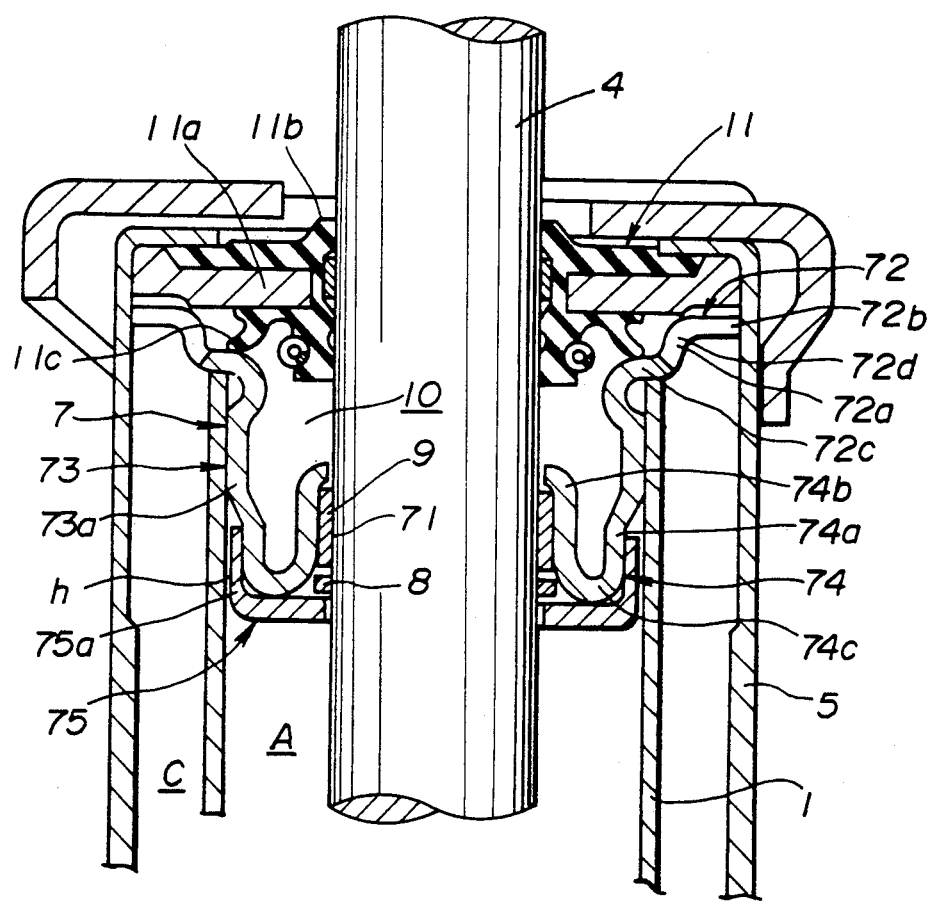
FIG. 2 is an enlarged sectional view which shows a rod guide of a hydraulic shock absorber of the invention.

Referring to FIG. 2, the rod guide 7 is shown. This rod guide is provided with a single square plate member pressed into a cylindrical member which includes an annular doubled section 74a and 74b folded inwardly to define a rod hole 71 through which the piston rod 4 slides.

The rod guide 7 also includes an upper flange 72 which has a square configuration before pressing, as viewed from a plane. Each corner of the flange 72 contacts with an inner wall of the outer cylinder 5 so that a clearance is defined between the inner wall and a circumferential edge of the flange 72 to serve as a leaked oil path 72a.

The rod guide 7 further includes a cylinder engaging section 73 below the flange 72. The cylinder engaging section 73 includes an annular wall 73a having a large diameter which tightly engages an inner wall of the cylinder 1 to support the rod guide thereto.

A U-shaped rod supporting section 74 extending downwardly from the cylinder engaging section 73 or the annular wall 73a which is provided with an outer annular wall 74a smaller than the annular wall 73a in diameter, a supporting annular wall 74b for supporting the piston rod 4, and a bottom wall 74c connecting between the walls 74a and 74b. An annular chamber is defined between the outer annular wall 74a of the rod supporting section 74 and the inner wall of the inner cylinder 1.

A stopper 75 is provided below the bottom wall 74c which includes an outer wall 75a engaging with a circumferential surface of the outer annular wall 74a so that a gap h is defined between the outer wall 75a and the inner wall of the inner cylinder 1.

A guide bushing 9 is attached to an inner wall of the supporting annular wall 74b of the rod supporting section 74. A guide seal ring 8 is disposed below the guide bushing 9 to establish liquid-tight sealing between an inner periphery thereof and the piston rod 4 so as to restrict a liquid within the upper chamber A from leaking into a cavity 10 defined above the rod guide 7. The stopper 75 serves to prevent the guide seal ring 8 from being dislodged.

An oil seal 11 is installed on an upper portion of the rod guide 7. This oil seal includes an annular reinforcement 11a which is attached to an inner surface of the outer cylinder 5 and a seal lip 11b which wraps an inside portion of the reinforcement 11a. The seal lip 11b has a check lip 11c extending below the reinforcement 11a which engages with the flange 72 of the rod guide 7 so as to establish a tight seal therebetween. The check lip 11c functions as a check valve to allow a liquid flowing into the cavity 10 from the upper chamber A through the guide bushing 9 to flow into the reservoir chamber C through the leaked oil path 72a, while preventing backflow.

The flange 72 is stepped and includes an outer flat section 72b which is attached to an upper portion of the inner cylinder 1, an inner flat section 72c which contacts with the check lip 11c, and an intermediate wall 72d connecting therebetween.

An upper end of the outer cylinder 5 is crimped so as to partly cover the oil seal 11 to provide internal residual stress to the oil seal 11 and the rod guide 7 for tightly fixing them.

As previously mentioned, the rod guide 7 is formed with one square plate member by means of press bending, resulting in light weight and easy processing thus decreasing manufacturing costs.

For assembling the rod guide 7, the cylinder engaging section 73 is first fitted on the inner peripheral surface of the inner cylinder 1 with the piston rod 4 being inserted into the rod hole 71. The outer flat section 72b of the flange 72 is then engaged with the inner upper peripheral surface of the outer cylinder 5 and inner flat section 72c contacts with a top edge of the inner cylinder 1.

The outer peripheral surface of the annular reinforcement 11a of the oil seal 11 is engaged with the inner surface of the outer cylinder 5 so as to be placed on the outer flat section 72b.

Subsequently, the upper end portion of the outer cylinder 5 is crimped. This crimp provides thrusting force in an axial direction to the rod guide 7 from the flange 72 through the oil seal 11 to transmit it to the cylinder engaging section 73.

With this arrangement, suitable installation of the rod guide 7 is accomplished with engagement between the flange 72 and the outer cylinder 5, between the engaging section 73 and the inner cylinder 1, and between the rod supporting section 74 and the piston rod 4.

Figure 3:
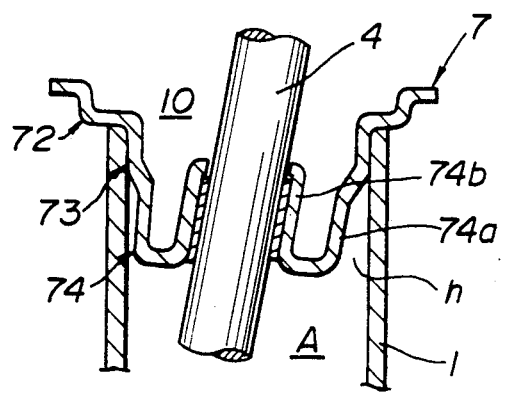
FIG. 3 is cross sectional view which shows deformation of a rod guide when lateral force acts on a piston rod.

In operation, exertion of lateral force on the piston rod during sliding causes it to be inclined, as shown in FIG. 3, while locally pressing the rod supporting section 74 of the rod guide 7. This causes the rod supporting section 74 to be deformed according to the inclination of the piston rod 4 to reduce pressure locally acting on the piston rod 4 (as compared to without the inclination) due to a certain degree of flexural rigidity of the rod supporting section provided by the gap h between the annular wall 75a and the inner cylinder 1 and flexibility of the plate member forming the rod supporting section 74.

It will be appreciated that friction created during piston sliding is reduced to achieve smooth displacement of the piston rod and improved durability.

During rebounding stroke of the piston rod 4, compression of the rebound rubber 3 against the stopper 5 below the rod guide 7 absorbs the rebounding force.

Figure 4:
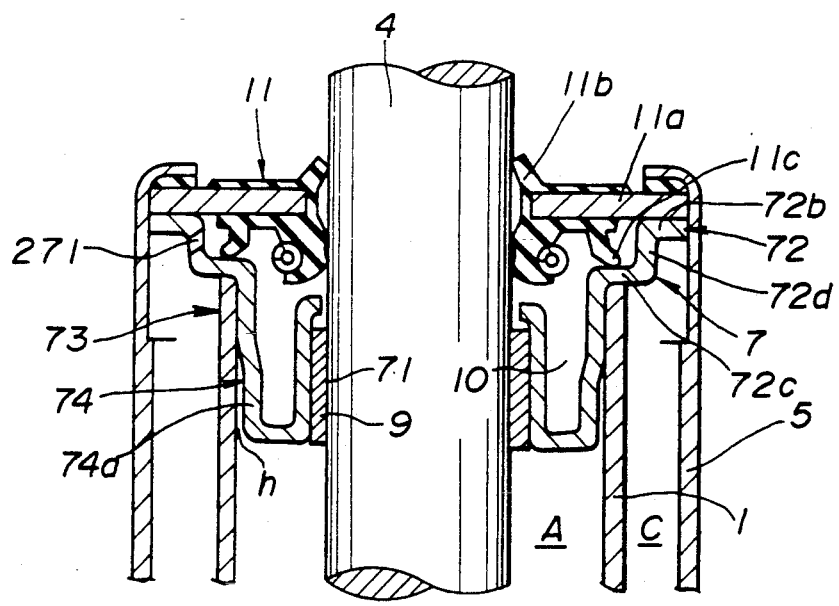
FIG. 4 is a partial cross-sectional view which shows a second embodiment of a hydraulic shock absorber of the invention.

Referring to FIG. 4, an alternate embodiment of the present invention is shown. The same construction as the first embodiment will not be described here again. This embodiment is different from the first embodiment in the following points.

A rod guide 7 is provided with a circular plate member to form an annular flange 72. All outer peripheral surfaces of the flange 72 are engaged with an outer cylinder 5. A leaked oil path 271 is formed in the flange 72 at a position outside a contact point with a check lip 11c.

A rod supporting section 74 includes only a guide bushing 9 without a guide seal ring and a stopper as utilized in the first embodiment. A gap h is defined between an outer annular wall 74a of the rod supporting section 74 and an inner periphery of an inner cylinder 1.

Figure 5:
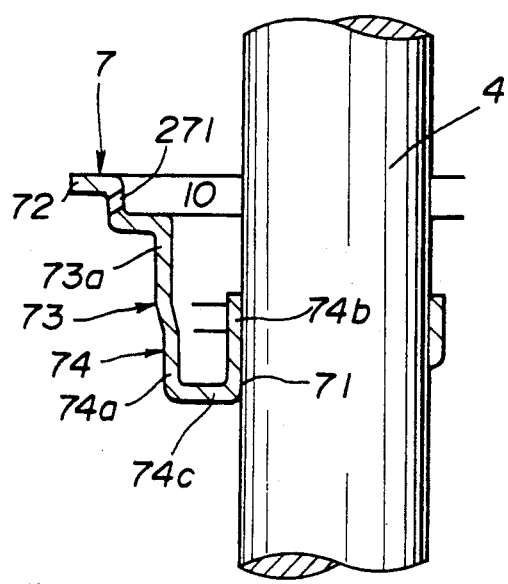
FIG. 5 is a partial cross-sectional view which shows a third embodiment of a hydraulic shock absorber.

Referring to FIG. 5, a third embodiment of the invention is shown which excludes a guide bushing, a guide seal ring, and a stopper so that a supporting annular wall 74b of a rod supporting section 74 directly contacts with a piston rod 4. A leaked oil path 271 is, similar to the second embodiment, provided above the rod guide 7.

Figure 6:
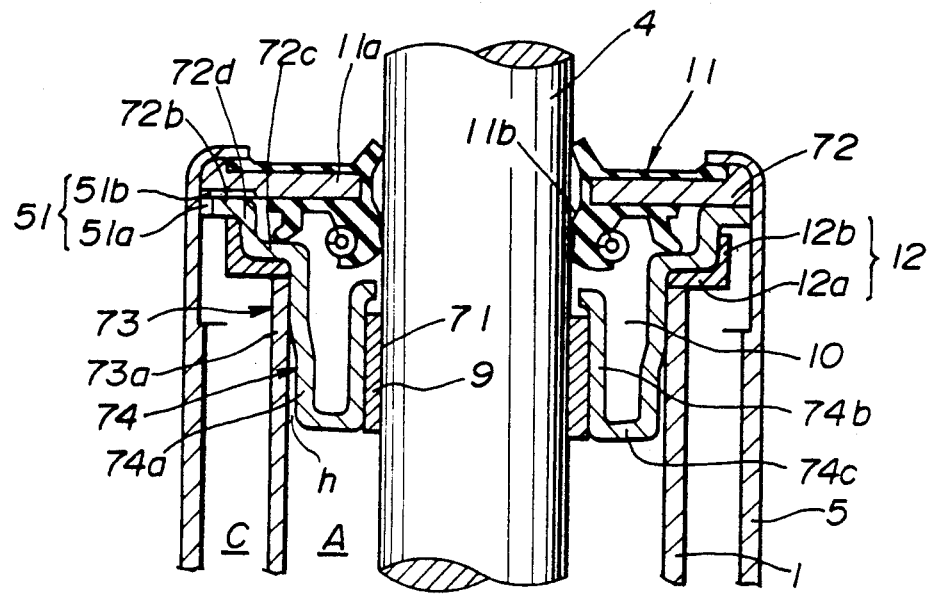
FIG. 6 is a partial cross-sectional view which shows a fourth embodiment of a hydraulic shock absorber.

Referring to FIG. 6, a fourth embodiment of the invention is shown. This embodiment is substantially the same as the second embodiment, but differs in that a reinforcement 12 is interposed between an upper portion of an inner cylinder 1 and a flange 72 supporting a guide seal ring 11. The reinforcement 12 includes annular plates 12a and 12b of L-shaped cross section which engages with a lower surface of an inner flat plate 72c of the flange 72 and an outer peripheral surface of a wall 72d. An inner end portion of the annular plate 12a is inserted between a top end of a cylinder and the inner flat plate 72c of the flange 72. The wall 72d of the flange 72 is fitted into an inner surface of the annular plate 12b. Additionally, a leaked oil path 51 is defined with a cut-out portion 51a formed in an outer periphery of the outer flat plate 72b and a communication groove 51b formed in a lower outer periphery of the reinforcement 11a.

In operation, exertion of compression force created by crimping of an upper end portion of an outer cylinder 5 or bounding force in an axial direction on the flange 72 through the reinforcement 11a of the oil seal 11 causes bending stress to be generated on the flange 72 with respect to a top edge of the inner cylinder 1 since positions where the axial forces act and the top edge of the inner cylinder 1 are shifted radially from each other. The flange 72 is deformed by the bending force since it is formed by pressing a single plate member to be enlarged resulting in weakened bending rigidity. It will be noted that internal residual stress created by the crimp of the outer cylinder 5 is reduced to reduce generation of noise during operation.

However, in the embodiments of the invention, rigidity of the reinforcement is, as described above, added to the inner flat plate 72b of the flange 72 and the wall 72d, reducing a bending stress acting on the flange 72.

With the arrangements of the embodiments, deformation of the flange 72 can be prevented to maintain the internal residual stress exerted on the oil seal 11 and the rod guide 7 and thus prevent noise from being generated during operation.

Figure 7:
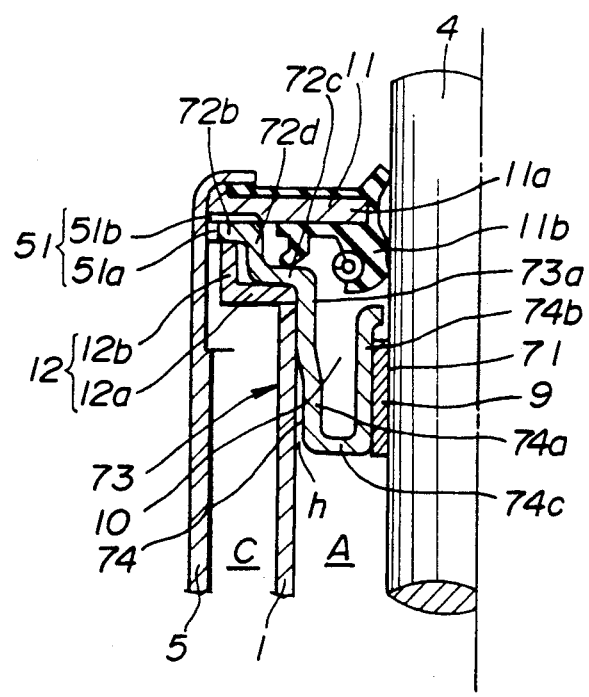
FIG. 7 is a partial cross-sectional view which shows a fifth embodiment of a hydraulic shock absorber.

Referring to FIG. 7, a fifth embodiment of the invention is shown. This embodiment is similar to the fourth embodiment in that a reinforcement 12 is interposed between a top edge of an inner cylinder 1 and a flange 72, but is different in the following respects.

The length of a vertical wall 12b of the reinforcement 12 is greater or equal to that of a vertical wall 72d of the flange 72 to input an axial force directly to the reinforcement 12 through an annular reinforcement 11a and an outer flat plate 72c of the flange 72, virtually preventing the bending force from acting on the flange 72.

Figure 8:
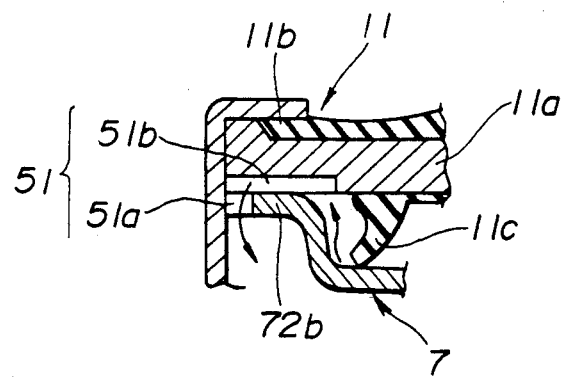
FIG. 8 is a partial cross-sectional view of a sixth embodiment of a hydraulic shock absorber which shows a fluid path communicating between an inner cylinder and a reservoir chamber.

Shown in FIG. 8, is the arrangement of a flange 72 of a rod guide 7 and a ring reinforcement 11a of an oil seal 11 for defining the leaked oil path 51 which was previously referred to in FIGS. 6 and 7.

Figure 9:
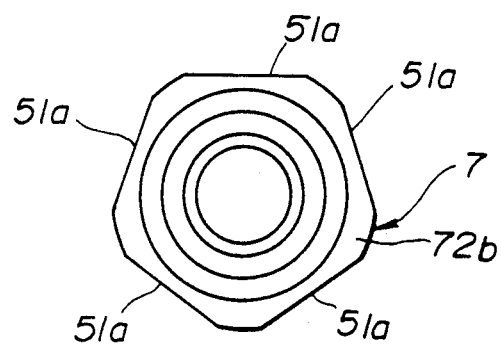
FIG. 9 is a plan view which shows a rod guide.
Figure 10:
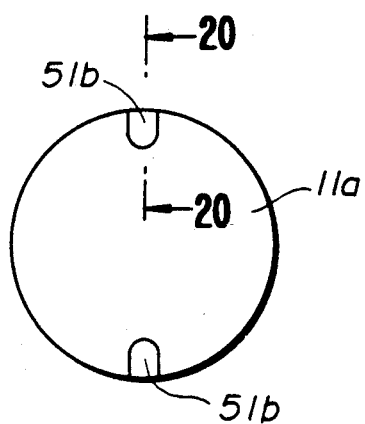
FIG. 10 is a plan view which shows a metal ring reinforcement of a seal associated with a rod guide.
Figure 11:
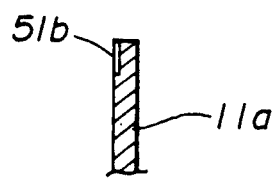
FIG. 11 is a sectional view taken along a line 20 in FIG. 10.

The flange 72 includes, as shown in FIG. 9, five chamfered surfaces 51a on an outer flat section 72c at given intervals. The ring reinforcement 11a includes, as shown in FIGS. 10 and 11, two recessed portions 51b at its peripheral portions which are diametrically opposed to each other and open to the outside. A combination of the chamfered surface 51a and the recessed portion 51b defines the leaked oil path 51 connecting between a reservoir chamber C and a chamber 10.

When the oil seal 11 and the rod guide 7 are fitted into an outer cylinder 5, at least one leaked oil path can be always formed without positioning the flange 72 and the ring reinforcement 11a in a circumferential direction since the five chamfered surfaces 51a are provided on the flange at regular intervals and the two recessed portions 51b are diametrically opposed to each other with respect the center of the ring reinforcement. The leaked oil path 51 is, as described above, is opened and closed by a check lip 11c.

With the above arrangement, the leaked oil path 51 communicating between the reservoir chamber C and the chamber 10 in the inner cylinder 1 provided with only the chamfered surfaces 51a of the rod guide 7 and the recessed portions 51b of the oil seal reinforcement 11a. Thus, the rod guide 7, especially the outer flat section 72b, can provide rigidity sufficient for receiving loads caused by bounding or rebounding motion of a vehicle body.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing from the principle of the invention as set out in the appended claims.

Figure 12:
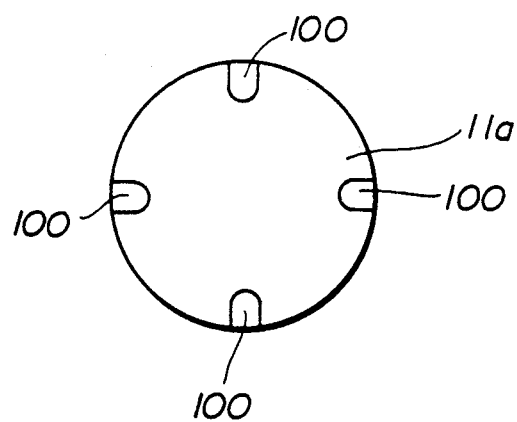
FIG. 12 is a plan view which shows an alternative embodiment of a metal ring reinforcement of a seal.

For example, as shown in FIG. 12, four recessed portions 100 may be provided in the oil seal reinforcement 11a which are circumferentially spaced from each other by regular intervals. Alternatively, an even number of recessed portions more than four may be provided. For the rod guide 7, an uneven number of chamfered surfaces more than five may be formed. Additionally, the relative number of recessed portions to chamfered surfaces may be reversed.

What is claimed is:

1. A shock absorber comprising:
   a cylinder assembly having an inner and outer cylindrical member defining a working chamber in which a piston rod is disposed and a reservoir chamber; and
   a rod guide, provided in an opening of said cylinder assembly, guiding bounding and rebounding strokes of the piston rod, said rod guide including a first cylindrical supporting section supporting said rod guide in said cylinder assembly and a second cylindrical supporting section supporting the piston rod within said working chamber, the second supporting section including an annular doubled wall section which is provided with outer and inner wall sections, the outer wall section having a portion extending from the first supporting section, the inner wall section extending inwardly from a portion of the outer wall section opposite the portion of the outer wall section which extends from the first supporting section, to support the piston rod and being spaced from the outer wall section to provide a preselected degree of flexibility to the second support section.

2. A shock absorber as set forth in claim 1, wherein the outer wall section of the second supporting section is spaced from an inner cylindrical wall of said cylinder assembly by a given interval.

3. A shock absorber as set forth in claim 1, wherein said rod guide is formed of a single, pressed plate member.

4. A shock absorber as set forth in claim 1, wherein the outer wall section continues from the first supporting section along the inner cylindrical wall of said cylinder assembly so as to provide a preselected interval therebetween, the inner wall section continuing from the outer wall section so as to be coaxially disposed within the outer wall section with a gap therebetween.

5. A shock absorber as set forth in claim 1, wherein the annular doubled wall section has a U-shaped cross-section which is defined by the outer and inner wall sections, the outer wall section extending along an inner wall of the cylinder assembly, the inner wall section extending along a surface of the piston rod.

6. A shock absorber, comprising:
   a cylinder assembly defining a working chamber in which a piston rod is disposed and a reservoir chamber;
   a rod guide, provided in an opening of said cylinder assembly, guiding bounding and rebounding strokes of the piston rod, said rod guide including a first cylindrical supporting section supporting said rod guide in said cylinder assembly and a second cylindrical supporting section supporting the piston rod within said working chamber, the second supporting section including an annular doubled wall section which is provided with outer and inner wall sections, the outer wall section having a portion extending from the first supporting section, the inner wall section extending inwardly from a portion of the outer wall section opposite the portion of the outer wall section which extends from the first supporting section, to support the piston rod and being spaced from the outer wall section to provide a preselected degree of flexibility to the second support section, and
   an oil seal disposed on the first supporting section of said rod guide contacting with a peripheral surface of the piston rod to seal the opening of said cylinder assembly and a reinforcement disposed in the oil seal to provide a preselected degree of flexural rigidity to the first supporting section.

7. A shock absorber as set forth in claim 6, wherein said oil seal is placed on the first supporting section of said rod guide, said reinforcement being a ring-shaped member, a circumferential section of said reinforcement engaging with the inner wall of said cylinder assembly and an inner section thereof being inserted into said oil seal.

8. A shock absorber as set forth in claim 6, wherein said reinforcement includes a recessed portion in its outer peripheral portion and the first supporting section of the rod guide includes a cut-out portion to define a communication path in cooperation with the recessed portion fluidly connecting the reservoir chamber and the working chamber.

9. A shock absorber comprising:
   a cylinder assembly including outer and inner cylindrical members, the outer cylindrical member having a circumferential edge portion at its end so as to define an opening, said cylinder assembly defining a working chamber within the inner cylindrical member in which a piston rod is disposed for bounding and rebounding strokes through the opening and a reservoir chamber between the outer and inner cylindrical members;
   an oil seal disposed within said cylinder assembly to contact with the piston rod so as to seal the opening of said cylinder assembly;
   a rod guide plate member, provided in said cylinder assembly, guiding bounding and rebounding strokes of the piston rod, said rod guide including first and second supporting sections, the first supporting section being placed on an edge of the inner cylindrical member and extending between the inner and outer cylindrical members to support said oil seal, the second supporting section
   including an annular doubled wall section which is provided with outer and inner wall sections, the outer wall section having a portion extending from the first supporting section, the inner wall section extending inwardly from a portion of the outer wall section opposite the portion of the outer wall section which extends from the first supporting section, to support the piston rod and being spaced from the outer wall section to provide a preselected degree of flexibility to the second support section; and
   a reinforcement provided between the first supporting section of said rod guide and the edge of the inner cylindrical member to provide a preselected degree of rigidity to the first supporting section.

10. A shock absorber as set forth in claim 9, wherein said rod guide plate member is a single, pressed plate member.

11. A shock absorber as set forth in claim 9, the outer wall section continuing from the first supporting section along the inner wall of said inner cylindrical member so as to provide a gap therebetween, the inner wall section continuing from the outer wall section so as to be coaxially disposed within the outer wall section with a given interval therebetween.

12. A shock absorber, comprising:
a cylinder assembly including outer and inner cylindrical members, the outer cylindrical member having a circumferential edge portion at its end so as to define an opening, said cylinder assembly defining a working chamber within the inner cylindrical member in which a piston rod is disposed for bounding and rebounding strokes through the opening and a reservoir chamber between the outer and inner cylindrical members;
an oil seal disposed within said cylinder assembly to contact with the piston rod so as to seal the opening of said cylinder assembly;
a rod guide plate member, provided in said cylinder assembly, guiding bounding and rebounding strokes of the piston rod, said rod guide including first and second supporting sections, the first supporting section being placed on an edge of the inner cylindrical member and extending between the inner and outer cylindrical members to support said oil seal, the second supporting section being disposed in the inner cylindrical member to support the piston rod;
a reinforcement provided between the first supporting section of said rod guide and the edge of the inner cylindrical member to provide a preselected degree of rigidity to the first supporting section; and
a second reinforcement, said second reinforcement having a peripheral surface engaging with an inner cylindrical wall of the outer cylindrical member and a recessed portion therein, the first supporting section of said rod guide having a chamfered surface at its edge so as to coincide with the recessed portion of said second reinforcement to define a communication path to fluidly connect the working chamber and the reservoir chamber.

13. A shock absorber comprising:
a cylinder assembly having an opening at its end, said cylinder assembly including outer and inner cylinder sections to define a working chamber in the inner cylinder section filled with a hydraulic working fluid and a reservoir chamber between the outer and inner cylinder sections filled with the hydraulic working fluid and a pneumatic working fluid;
a piston rod disposed within the inner cylinder section to reciprocate through the opening of said cylinder assembly;
a rod guide member disposed within said cylinder assembly guiding bounding and rebounding strokes of said piston rod, said rod guide including first and second supporting sections, the first supporting section having a peripheral surface, engaging with an end portion of said cylinder assembly for supporting said rod guide, on which a chamfered surface is formed, the second supporting section supporting said piston rod;
an oil seal contacting with the piston rod so as to seal the opening of said cylinder assembly;
a supporting member directly engaging with the end portion of said cylinder assembly to support said oil seal, said supporting member having a groove in its edge portion which coincides with the chamfered surface of the first supporting section of said rod guide; and
a communicating path defined by the chamfered surface of said rod guide and the groove of said supporting member to fluidly communicate between the working chamber and reservoir chamber.

14. A shock absorber comprising:
a cylinder assembly having an opening at its end, said cylinder assembly including outer and inner cylinder sections to define a working chamber in the inner cylinder section filled with a hydraulic working fluid and a reservoir chamber between the outer and inner cylinder sections filled with the hydraulic working fluid and a pneumatic working fluid;
a piston rod disposed within the inner cylinder section to reciprocate through the opening of said cylinder assembly;
a rod guide member disposed within said cylinder assembly guiding bounding and rebounding strokes of said piston rod, said rod guide including first and second supporting sections, the first supporting section having a peripheral surface, engaging with an end portion of said cylinder assembly for supporting said rod guide, on which a chamfered surface is formed, the second supporting section supporting said piston rod;
an oil seal contacting with the piston rod so as to seal the opening of said cylinder assembly;
a supporting member engaging with the end portion of said cylinder assembly to support said oil seal, said supporting member having a groove in its edge portion which coincides with the chamfered surface of the first supporting section of said rod guide; and
a communicating path defined by the chamfered surface of said rod guide and the groove of said supporting member to fluidly communicate between the working chamber and reservoir chamber,
wherein said supporting member is partly inserted into said oil seal to provide a preselected degree of rigidity to the first supporting section of said rod guide.

15. A shock absorber comprising:
a cylinder assembly having an opening at its end, said cylinder assembly including outer and inner cylinder sections to define a working chamber in the inner cylinder section filled with a hydraulic working fluid and a reservoir chamber between the outer and inner cylinder sections filled with the hydraulic working fluid and a pneumatic working fluid;
a piston rod disposed within the inner cylinder section to reciprocate through the opening of said cylinder assembly;
a rod guide member disposed within said cylinder assembly guiding bounding and rebounding strokes of said piston rod, said rod guide including first and second supporting sections, the first supporting section having a peripheral surface, engaging with an end portion of said cylinder assembly for supporting said rod guide, on which a chamfered surface is formed, the second supporting section supporting said piston rod;
an oil seal contacting with the piston rod so as to seal the opening of said cylinder assembly;
a supporting member engaging with the end portion of said cylinder assembly to support said oil seal, said supporting member having a groove in its edge portion which coincides with the chamfered surface of the first supporting section of said rod guide; and a communicating path defined by the chamfered surface of said rod guide and the groove of said supporting member to fluidly communicate between the working chamber and reservoir chamber, wherein the second supporting section of said rod guide includes an annular doubled wall section which includes outer and inner wall sections, the outer wall section continuing from the first supporting section along the inner wall of said cylinder assembly so as to provide a gap therebetween, the inner wall section continuing from the outer wall section so as to be coaxially disposed within the outer wall section with a given interval therebetween so as to allow said d rod guide to be deformed according to inclination of the piston rod to reduce friction between the piston rod and said rod guide.

16. A shock absorber, comprising:

a cylinder assembly defining a working chamber in which a piston rod is disposed and a reservoir chamber;

a rod guide, provided in an opening of said cylinder assembly, guiding bounding and rebounding strokes of the piston rod, said rod guide including a first cylindrical supporting section supporting said rod guide in said cylinder assembly and a second cylindrical supporting section supporting the piston rod within said working chamber, the second supporting section including an annular doubled wall section which is provided with outer and inner wall sections, the outer wall section having a portion extending from the first supporting section, the inner wall section extending inwardly from a portion of the outer wall section opposite the portion of the outer wall section which extends from the first supporting section, to support the piston rod and being spaced from the outer wall section to provide a preselected degree of flexibility to the second support section, and said cylinder assembly includes outer and inner clyindrical members, said cylinder assembly defining the working chamber within the inner cylindrical member and the reservoir chamber between the outer and inner cylindrical members, the first supporting section of said rod guide extending from an edge of the inner cylindrical member toward an inner wall of the outer cylindrical member and the second supporting section being disposed in the inner cylindrical member to support the piston rod.

17. A shock absorber, comprising:

a cylinder assembly including outer and inner cylindrical members, the outer cylindrical member having a circumferential edge portion at its end so as to define an opening, said cylinder assembly defining a working chamber within the inner cylindrical member in which a piston rod is disposed for bounding and rebounding strokes through the opening and a reservoir chamber between the outer and inner cylindrical members;

an oil seal disposed within said cylinder assembly to contact with the piston rod so as to seal the opening of said cylinder assembly;

a rod guide plate member, provided in said cylinder assembly, guiding bounding and rebounding strokes of the piston rod, said rod guide including first and second supporting sections, the first supporting section being placed on an edge of the inner cylindrical member and extending between the inner and outer cylindrical members to support said oil seal, the second supporting section being disposed in the inner cylindrical member to support the piston rod;

a reinforcement provided between the first supporting section of said rod guide and the edge of the inner cylindrical member to provide a preselected degree of rigidity to the first supporting section; and wherein the reinforcement has a substantially L-shaped configuration.

18. A shock absorber, comprising:

a cylinder assembly including outer and inner cylindrical members, the outer cylindrical member having a circumferential edge portion at its end so as to define an opening, said cylinder assembly defining a working chamber within the inner cylindrical member in which a piston rod is disposed for bounding and rebounding strokes through the opening and a reservoir chamber between the outer and inner cylindrical members;

an oil seal disposed within said cylinder assembly to contact with the piston rod so as to seal the opening of said cylinder assembly;

a rod guide plate member, provided in said cylinder assembly, guiding bounding and rebounding strokes of the piston rod, said rod guide including first and second supporting sections, the first supporting section being placed on an edge of the inner cylindrical member and extending between the inner and outer cylindrical members to support said oil seal, the second supporting section being disposed in the inner cylindrical member to support the piston rod;

a reinforcement provided between the first supporting section of said rod guide and the edge of the inner cylindrical member to provide a preselected degree of rigidity to the first supporting section; and wherein the first supporting section supports said rod guide plate member to said cylinder assembly, the second supporting section supporting the piston rod within said working chamber and including an annular doubled wall section which is provided with outer and inner wall sections, the outer wall section extending from the first supporting section, the inner wall section formed integrally with the outer wall section and extending inwardly from a portion of the outer wall section opposite the portion extending from the first supporting section to support the piston rod and being spaced from the outer wall section to define a gap therebetween so as to provide a preselected degree of flexibility to the second supporting section.

* * * * *